(12) United States Patent
Staple et al.

(10) Patent No.: US 10,749,685 B2
(45) Date of Patent: Aug. 18, 2020

(54) NETWORK PROVISIONING SYSTEMS AND METHODS

(71) Applicant: First Data Corporation, Greenwood Village, CO (US)

(72) Inventors: John Staple, Coral Springs, FL (US); Brian Frey, Coral Springs, FL (US); Lee Korotzer, Tamarac, FL (US); Guillaume Lebleu, San Francisco, CA (US)

(73) Assignee: First Data Corporation, Greenwood Village, CO (US)

( * ) Notice: Subject to any disclaimer, the term of this patent is extended or adjusted under 35 U.S.C. 154(b) by 325 days.

(21) Appl. No.: 15/830,914

(22) Filed: Dec. 4, 2017

(65) Prior Publication Data
US 2018/0159688 A1 Jun. 7, 2018

Related U.S. Application Data

(60) Provisional application No. 62/429,229, filed on Dec. 2, 2016.

(51) Int. Cl.
| | |
|---|---|
| *H04L 29/06* | (2006.01) |
| *H04L 9/32* | (2006.01) |
| *H04L 9/30* | (2006.01) |
| *H04L 9/14* | (2006.01) |
| *H04L 9/06* | (2006.01) |

(52) U.S. Cl.
CPC .......... *H04L 9/3247* (2013.01); *H04L 9/0637* (2013.01); *H04L 9/14* (2013.01); *H04L 9/30* (2013.01); *H04L 9/3236* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 10,565,645 B1 * | 2/2020 | Kurani | G06Q 40/04 |
| 2015/0262168 A1 * | 9/2015 | Armstrong | G06Q 20/363 705/39 |
| 2017/0011392 A9 * | 1/2017 | Lingham | G06Q 20/389 |
| 2017/0286951 A1 * | 10/2017 | Ignatchenko | G06Q 20/3823 |
| 2018/0159688 A1 * | 6/2018 | Staple | H04L 9/30 |
| 2018/0204191 A1 * | 7/2018 | Wilson | H04L 9/30 |
| 2018/0204192 A1 * | 7/2018 | Whaley | G06Q 20/401 |
| 2018/0285796 A1 * | 10/2018 | Kovacevic | G06Q 50/22 |
| 2019/0156303 A1 * | 5/2019 | Shtylman | G06Q 20/3829 |
| 2019/0356641 A1 * | 11/2019 | Isaacson | G06Q 20/40 |
| 2020/0099518 A1 * | 3/2020 | Jacobs | G06Q 20/3825 |

* cited by examiner

*Primary Examiner* — Jeffery L Williams
(74) *Attorney, Agent, or Firm* — Kilpatrick Townsend & Stockton LLP

(57) ABSTRACT

Provisioning a data rate includes receiving a digitally signed request from a requester device for data and appending the request to a distributed ledger. At least one set of digitally signed data is received from at least one data provider system. Each data set is appended to the ledger and a particular data set is selected from the at least one data set. The selected data set is provided to the requester device. A digitally signed command to provision the selected data set is received from the requester device. The command is digitally signed using the public key of the requester device. The command to provision the selected data set is appended to the ledger, causing the data provider system to be notified, and the selected data set is provisioned.

19 Claims, 5 Drawing Sheets

NETWORK PROVISIONING SYSTEMS AND METHODS

CROSS-REFERENCES TO RELATED APPLICATIONS

This application claims the benefit of U.S. Provisional Patent Application No. 62/429,229, filed Dec. 2, 2016, entitled "NETWORK PROVISIONING SYSTEMS AND METHODS," the entirety of which is hereby incorporated by reference for all intents and purposes.

BACKGROUND OF THE INVENTION

Conventional data provisioning systems operate with only a single data provider at a time. This only allows a single data set to be acquired in a given interaction. Moreover, conventional data provisioning systems store records of provisioned data on a central database, without providing other parties access to the database. Thus, parties interacting with the conventional data provisioning systems must rely on the provisioning system to provide assurance of the validity of requests and data provided by other parties. This creates security and data trust issues.

BRIEF SUMMARY OF THE INVENTION

Systems and methods are provided that enable a requester to acquire data from a number of data providers in a single interaction using a single provisioning system. The systems and methods described herein utilize a distributed ledger that is accessible to all parties interacting with the provisioning system such that any party may verify data and requests. The use of a distributed ledger ensures a greater level of data authenticity as compared to conventional systems. The data and requests may be validated by the use of public and private keys associated with each party.

In one aspect, a data provisioning system is provided. The data provisioning system may include a memory, at least one communications interface configured to enable communication with a requester device and at least one data provider system, and a processor. The processor may be configured to receive, from the requester device, a digitally signed request for data. The digitally signed request may be digitally signed using a private key of the requester device. The processor may also be configured to retrieve at least one digitally signed data set from each of the at least one data provider system. Each of the at least one digitally signed data sets may have been digitally signed using a private key of a respective one of the at least one data provider system.

The processor may be further configured to append each of the at least one digitally signed data set to a distributed ledger. The distributed ledger may be run on a plurality of remotely located nodes. The distributed ledger may include digitally signed data related to previous interactions of the data provisioning system. The processor may be configured to select a particular data set from the at least one digitally signed data sets, provide the selected data set to the requester device based on the digitally signed request for the data, and receive, from the requester device, a digitally signed command to provision the selected data set. The processor may also be configured to append the digitally signed command to provision the selected data set to the distributed ledger. Appending the digitally signed command may cause a particular one of the at least one data provider system associated with the selected data set to be notified of the digitally signed command. The processor may be further configured to provision the selected data set.

In another aspect, a method for provisioning data is provided. The method may include receiving, from the requester device, a digitally signed request for a data. The digitally signed request may have been digitally signed using a private key of the requester device. The method may also include retrieving at least one digitally signed data set from each of the at least one data provider system. Each of the at least one digitally signed data set may have been digitally signed using a private key of a respective one of the at least one data provider system.

The method may further include appending each of the at least one digitally signed data set to a distributed ledger. The distributed ledger may be run on a plurality of remotely located nodes. The distributed ledger may include digitally signed data related to previous interactions of the data provisioning system. The method may include selecting a particular data set from the at least one digitally signed data set, providing the selected data set to the requester device based on the digitally signed request for the data set, and receiving, from the requester device, a digitally signed command to provision the selected data set. The digitally signed command may have been digitally signed using the public key of the requester device. The method may also include appending the digitally signed command to provision the selected data set to the distributed ledger. Appending the digitally signed command may cause a particular one of the at least one data provider system associated with the selected data set to be notified of the digitally signed command. The method may further include provisioning the selected data set.

In another aspect, a system for provisioning data may include a data provisioning system comprising a memory, at least one communications interface, and a processor. The system may also include at least one requester device and a plurality of data provider devices. Each of the at least one requester device and each of the plurality of data provider devices may operate a node of the provisioning system on which some or all of a distributed ledger is stored. The distributed ledger may include a record of previous interactions between the provisioning system, the at least one requester device, and the plurality of data provider devices. Entries of the distributed ledger may be readable by the provisioning system, the at least one requester device, and the plurality of data provider devices using a public key provided by an originating device of each entry. Information provided to the provisioning system by the at least one requester device or the plurality of data provider devices during interactions with the provisioning system may be digitally signed using a private key associated with an entity providing the information.

The processor may be configured to append the information to the distributed ledger, receive requests from the at least one requester device, and retrieve data provided by the plurality of data provider devices. The processor may also be configured to select a data set from the retrieved data, provide the selected data set to the at least one requester device, and receive a command to provision the selected data set from the at least one requester device. The processor may be further configured to provision the selected data set.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
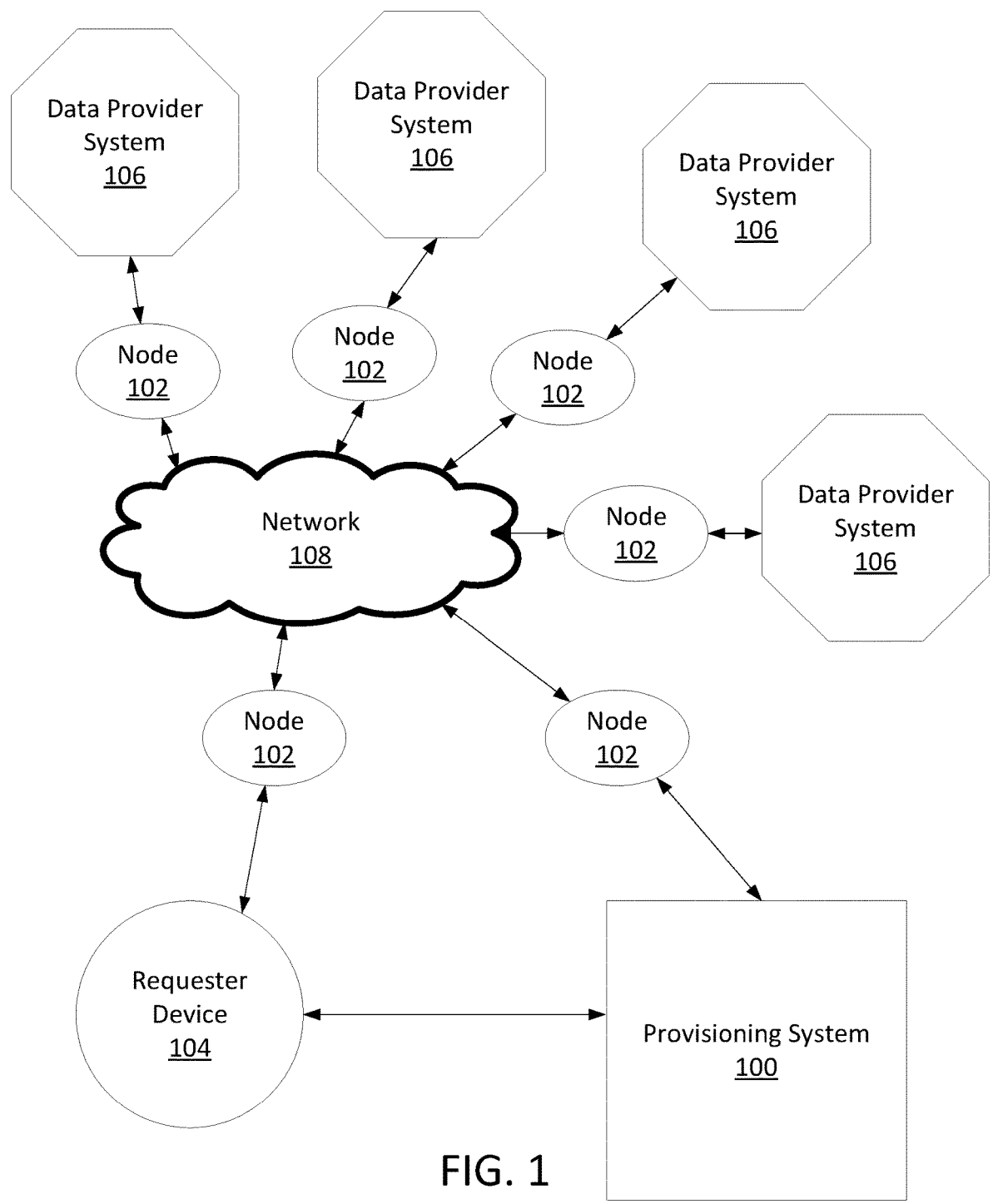
FIG. 1 is a system diagram depicting a system for provisioning a data set according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Systems and methods are provided for the real-time (or near real-time) provisioning of data, with data being provided from a number of data providers. This allows data requesters to access data from any number of data providers using a single point of integration, the provisioning system. Additionally, the provisioning systems described herein allow for data providers to see data provided by other providers by publishing information related to requests and data in a distributed ledger that is accessible to all parties that interact with the provisioning system. In some embodiments, the provisioning systems prevent data providers from seeing the source of the other data, while still publishing the data itself. The ability to acquire data from a large number of data providers, each of whom can see the data provided by other data providers, drives competition, making for better data.

The provisioning systems described herein tie the provisioning of data to a secure, open environment, while providing a full audit trail. This is due to the technological structure supporting such systems and methods, which utilize a distributed ledger running at a number of nodes to record all exchanges. By maintaining custody of information related to all the exchanges, the integrity of the provisioning system may be maintained, without the need for a trusted intermediary. Additionally, the distributed ledger provides transparency that allows all users of the provisioning system to view the various interactions with the provisioning system, thus providing additional validation of the accuracy to each party interacting with the provisioning system.

The provisioning system may utilize public key cryptography to help validate various functions performed by the provisioning system. Each participant device may use one or more self-assigned public/private key pairs. In some embodiments, these keys are assigned to the various participants/devices by the provisioning system. Public keys are used as pseudonymous identifiers in interactions with the system, therefore obfuscating their identity to other participants. Private keys are used to digital sign messages sent by participants, therefore ensuring authenticity.

As one example of the use of public and private keys, when a data provider system sends data to the provisioning system, the data provider system may digitally sign the message using the data provider system's private key. Each node or device in the network of the provisioning system can cross check that the data originated from the particular data provider system by verifying the digital signal using the data provider's public key.

Each data may include two different locks. A short term data lock duration may be included that specifies an amount of time that the data is to be guaranteed to a requester. This data lock duration ensures that a requesting party has sufficient time to view and select a given data, such as by issuing a command to provision the data. Oftentimes, the data lock duration may be a number of minutes, such as 10 minutes, that ensures that the requester has a chance to lock in the data without unduly compromising the data provider's ability to adjust data based on various market factors. A second data guarantee duration provides a much longer period of time, often on the order of days, weeks, or months, for which a data, once locked, is guaranteed. These data locks in conjunction with the use of digital signatures provide a guarantee to requesters that particular data is valid and may be provisioned, as each data set including such data locks is digitally signed by the data provider. The requester may then verify the identity of the data by validating the digital signature using a corresponding public key.

The infrastructure of the systems and methods allows for quicker data provisioning over conventional systems. Conventional systems typically require a series of requests/responses using bilateral bespoke protocols between one or more intermediaries between the data requestor and data provider, with the goal to achieve consensus on a trade. In contrast, a distributed ledger provides a built in consensus reaching mechanism that can support an overall quicker mechanism for broadcasting and validating transactions across several participants, while reducing the need for relaying intermediaries in the process.

While the provisioning systems disclosed herein enable data to be provided by a number of data providers, in some cases a data requester may select a particular data provider from which a data set is to be provisioned. This limits the data source to a single data provider and allows a requester to limit the data source to a single trusted partner. In other embodiments, a requester may select a subset of the data providers that work with the provisioning system. As just one example, the requester may select three data providers to receive data from, while data from another ten data providers are not requested.

Turning now to FIG. 1, one embodiment of devices networked with a provisioning system 100 is shown. Provisioning system 100 may be a computing system that operates smart code to facilitate currency exchanges between parties. Provisioning system 100 may implement a decentralized ledger, such as using blockchain technology. Use of a decentralized ledger allows multiple parties to transfer and store sensitive information in a space that is secure, permanent, pseudoanonymous, and easily accessible. This simplifies paper-heavy, expensive, and/or logistically complicated systems. The ledger is amended without input or approval from a controlling entity. Entire networks, in the form of networked devices/nodes determine the validity of data within the ledger. This eliminates the need for a third-party or other intermediary to monitor and verify the information, such as data and requests. If anyone attempts to tamper with a ledger entry, the rest of the network will disagree on the integrity of that entry and will not incorporate the entry.

In some embodiments, the provisioning system 100 may be implemented as smart code that is deployed at an address on the provisioning system 100 and/or on nodes 102 that may each store all or part of the decentralized ledger. These provisioning system nodes 102 may be operated by the provisioning system 100 and/or by one or more third parties. One or requester devices 104 and one or more data provider system 106 may connect to the provisioning system 100 using one or more networks 108.

Network 108 may be a local area network (LAN) and/or other private or public wired and/or wireless networks. Network 108 may utilize one or more of Wi-Fi, ZigBee, Bluetooth™, Bluetooth™ Low Energy, a cellular communications protocol such as 3G, 4G, or LTE, and/or any other wireless communications protocol. It will be appreciated that one or more different network connections may be used in accordance with the invention, and that the use of a single network 108 to enable communications is merely one example of such configurations. For example, each component may be communicatively coupled with other components using a separate network for one or more of the connections.

The address of each node 102 and/or other device is known to the participants of the provisioning system 100 such that applications in communication with the provisioning system 100 can deposit assets to the address, subscribe to events, and withdraw assets from the address. The smart code maintains a list or ledger of data and a status (such as amount of time remaining or maximum amount associated with the data) throughout the lifecycle of each data set.

Each requester device 104 and data provider system 106 is connecting to the provisioning system 100 via an application that communicates with a provisioning system node 102 via a network API. For instance, the requester device 104 may connect to the provisioning system 100 via an application running on the requesting device, which may connect to one of the provisioning system nodes 102 via a network API. Similarly the data computing device may be connected to the provisioning system 100 using an exchange application, which connects to one of the provisioning system nodes 102 via a network API. Depending on their level of trust, each requester device 104 and/or data provider system 106 may operate or act as its own provisioning system node 102 or connect to an existing provisioning system node 102 operated by a party it trusts. In some embodiments, the requestor devices 104 may connect directly to the provisioning system 100 via the network 108, without connecting through a provisioning system node 102.

Requesters may be individuals, businesses, and/or other entity. Requester devices 104 may provide the provisioning system 100 with requests for data. Each request may be digitally signed using a private key associated with the requester device 101.

Upon receiving a request from a requester device 104, the provisioning system 100 and/or other entity may validate the digitally signed request using the sender's public key. The provisioning system 100 may then retrieve a number of data sets from one or more of the data provider systems 106. The provisioning systems 100 may retrieve the data sets from the decentralized ledger on one or more of the provisioning system nodes 102 and/or may send requests to one or more of the data provider systems 106, which may then supply data sets to the provisioning system 100. These data sets may be locked for a particular period of time and/or be only valid for a particular request. In some embodiments, a requester may only wish to receive a data from a particular subset of one or more data provider systems 106. For example, a requester may only want to receive a data from a particular data provider system 106 that the requester has partnered with. The request sent by the requester device 104 may include an identifier associated with the particular data provider system 106. The provisioning system 100 may then retrieve a data set only from the particular data provider system 106 identified in the request. Upon receipt, each data set received from the data provider systems 106 may be appended to the distributed ledger. This serves to lock in the data set and provide proof of the validity of the data set, as each requester device 104 and/or can access and validate the posted data sets in the ledger using its public key. The datasets may be digitally signed by each respective data provider systems 106 using its private key.

In one particular embodiment, the data may be a rate, such as a rate for a currency exchange. In such embodiments, the request for an exchange rate may be received by a provisioning system from a rate requester. The rate requester may be an acquirer, a merchant, an individual, or other entity, and the request may be communicated using a requester device. Requester devices may include, without limitation, point of sale (POS) devices, personal computing devices, mobile computing devices, merchant computing systems, and/or other networked-enabled computing devices. The request may include an exchange amount, as well as an identifier of the base currency and the foreign currency. The exchange amount may be a volume and/or range of currency to be exchanged. In some embodiments, the request may also include an identifier associated with a particular rate provider that the requester wishes to utilize. The provisioning system may receive the request and retrieve one or more rates from rate providers. This may involve retrieving rates previously received from rate providers and/or prompting for and receiving new rates from one or more of the rate providers. One or more of these rates may be provided to the requester by the provisioning system. For example, in some embodiments, the requester may specify that only a rate from rate provider X should be provided. In other embodiments, the provisioning system may determine a best rate of the retrieved rates, and provide only the best rate to the requester. Oftentimes, the best rate will be the highest or lowest rate retrieved by the provisioning system, although the best data may be determined based on other factors, such as incentives provided by a rate provider to a particular requester. The provisioning system may then receive an input from the requester directing the provisioning system to provision the particular rate, thus locking in or guaranteeing the particular rate. Upon receiving this input, the provisioning system may communicate a record of the input to the rate provider associated with the particular rate and initiate the rate provisioning process. Provisioning the rate may include compiling rules and/or instructions for the requester and the rate provider that instruct each party on how to fulfill the terms of the currency exchange. The instructions may be communicated to each party. Once the instructions are fulfilled, the provisioning system may receive a confirmation of the fulfillment from the participants, which may then be appended to the decentralized ledger.

The requests may include any information related to the rate. For example, a request may include an exchange amount, an identifier for base currency, an identifier for a foreign currency, a particular rate/data provider system 106 to request a rate from (if the requester only wants a rate to be retrieved from one rate provider system 106), and/or other information.

In some embodiments, the rate/data provider systems 106 may be operated by financial providers, such as international banks, dynamic currency conversion providers, and/or other currency exchanging entity. For example, data provider systems 106 may be operated by issuers of currency denominated IOUs called currency assets. For instance, one data provider system 106 may issue U.S. dollars while another data provider system 106 may issue euros. The IOUs represent liabilities of the respective issuer in the given currency, which may be used to fund offers or withdrawn from the provisioning system 100 to a bank account. These assets are used to fund exchanges completed on the provisioning system 100. The assets may be self-issued issued by another issuer to a participant (requester device 104 and/or data provider system 106) in exchange for bank funds. Each asset is implemented using smart code that is deployed at an address on the provisioning system 100. The provisioning system 100 uses the smart code to implement a transfer function, to transfer the asset from one participant's address to another participant's address.

In some embodiments, rates from data providers may be designated as only being valid for a specific request. For example, a specific requester may request a rate to exchange a particular amount of a particular type of currency X for currency Y. For example, a request may be for a particular bank's currency or IOU, such as "Bank A USD." Such a currency may only be offered by Bank A, so the provisioning system may retrieve only rates from Bank A for the particular request. In some embodiments the rate provider may choose to provide a rate specific to such an exchange, and may inform the provisioning system that the particular rate is only available to the requester for the particular amount in that particular currency. In other embodiments, the rates may be provided for a set period of time. The rates may then be valid for any exchange with any requester within the time period. In some embodiments, the time period may be predetermined and communicated to the provisioning system along with the data. In other embodiments, a rate provider may provide a rate without an expiration time so as to make the rate valid for an indefinite period of time. The rate provider may then later provide a new rate that overrides the previous rate. In yet other embodiments, the rate may be provided for spot trading purposes and/or other exchange of a large volume of currency.

In some embodiments, a rate provided by a rate provider system 106 may include an identifier of the rate provider system 106, the rate, a base currency identifier, a foreign currency identifier, a maximum volume or range of currency to be exchanged, a duration of time to lock the rate while presenting the rate to the requester, a duration a rate is guaranteed upon receiving notification the rate is to be provisioned and/or other information. In some embodiments, such as for a rate provided for a specific request, the rate may also include an identifier of the requester device 104.

In some embodiments, a single rate provider may provide a number of rates at a single time. This may occur, for example, when a rate provider is willing to offer better rates for different volumes of currency. As just one example, a rate provider may provider better rates as the currency volume increases. In such cases, each rate may include a range of currency amounts for which the rate is valid. Each rate may be digitally signed and appended to the distributed ledger. If the provisioning system 100 receives a request with a currency identifier and currency volume matching those in a rate on the distributed ledger, the provisioning system 100 may identify the rate as a possible match for the request.

The provisioning system 100 may select a best rate, such as a highest exchange rate, and provide the selected rate to the requesting device 104. In cases where only a single rate was requested, the single rate may be selected. If the requester is satisfied with the rate, the requesting device 104 may then communicate an input instructing the provisioning system 100 to provision the selected rate, thus locking in or guaranteeing the selected rate for the particular request. The rate provider system 106 associated with the selected rate may be informed by the provisioning system 100 of the instructions to provision the selected rate. Provisioning the rate may initiate a process in which amounts of the base currency and the foreign specified in the request are swapped.

Figure 2:
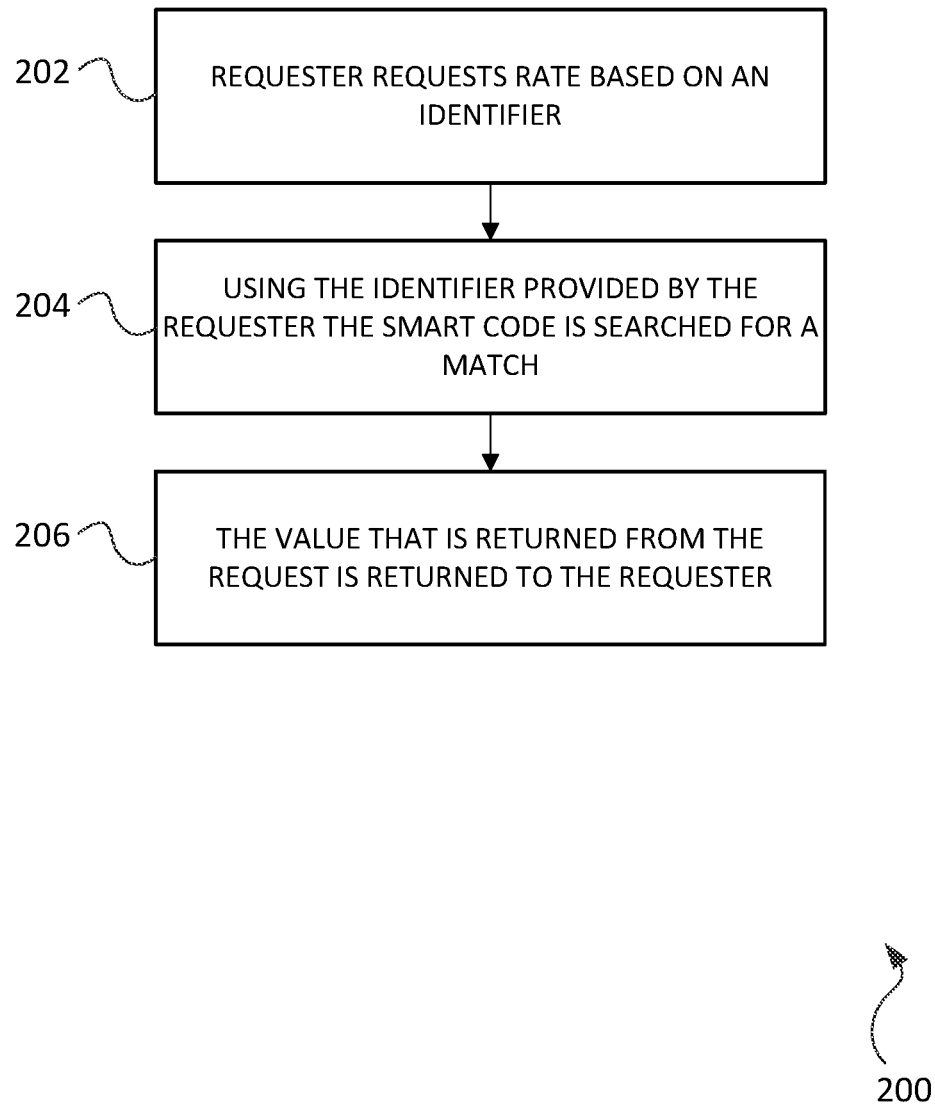
FIG. 2 is a flowchart of a process for identifying a currency identifier according to embodiments.

In some embodiments, the requester may not know a full identifier of a base currency and/or a foreign currency involved in an exchange. For example, a requester may be using a POS device to attempt to exchange paper currency, value from a stored value card, value from a credit card, and/or other currency value. The requester may not be knowledgeable about whether the particular form of currency is exchangeable or what is the associated currency identifier. FIG. 2 depicts a flow diagram of a process 200 for identifying the full currency identifiers or currency code of a particular type of currency. In some embodiments, a currency code may include multiple pieces of information, such as an issuing bank identifier and/or a type of physical currency. For example, a currency code may include an identifier associated with "Bank A" and an identifier of the physical currency, such as U.S. dollars (USD), Euros, or the like. Thus, a complete currency code may be Bank A USD. In some embodiments, the identifier of the issuer may include a bank identification number (BIN), although any identifier associated with an issuer may be used. Process 200 may be performed by requester devices and/or provisioning systems, such as those described in relation to FIG. 1. At block 202, the requester may request a rate based on an identifier. The identifier may be provided to a requester device and/or provisioning system. This may be done by the requesting party entering in any known identifier, such as a card number, currency type, and the like. In other embodiments, a device such as a POS device may read information from a payment media, such as a negotiable instrument, credit card, and/or stored value card. This information may include an identifier or token associated with a particular issuer. At block 204, the provisioning system searches for a matching full identifier. The provisioning system may then return a matching full identifier or currency code to the requester device at block 206. This currency code, identifying an issuer and type of currency, may then be used to submit a request for a particular rate.

Figure 3:
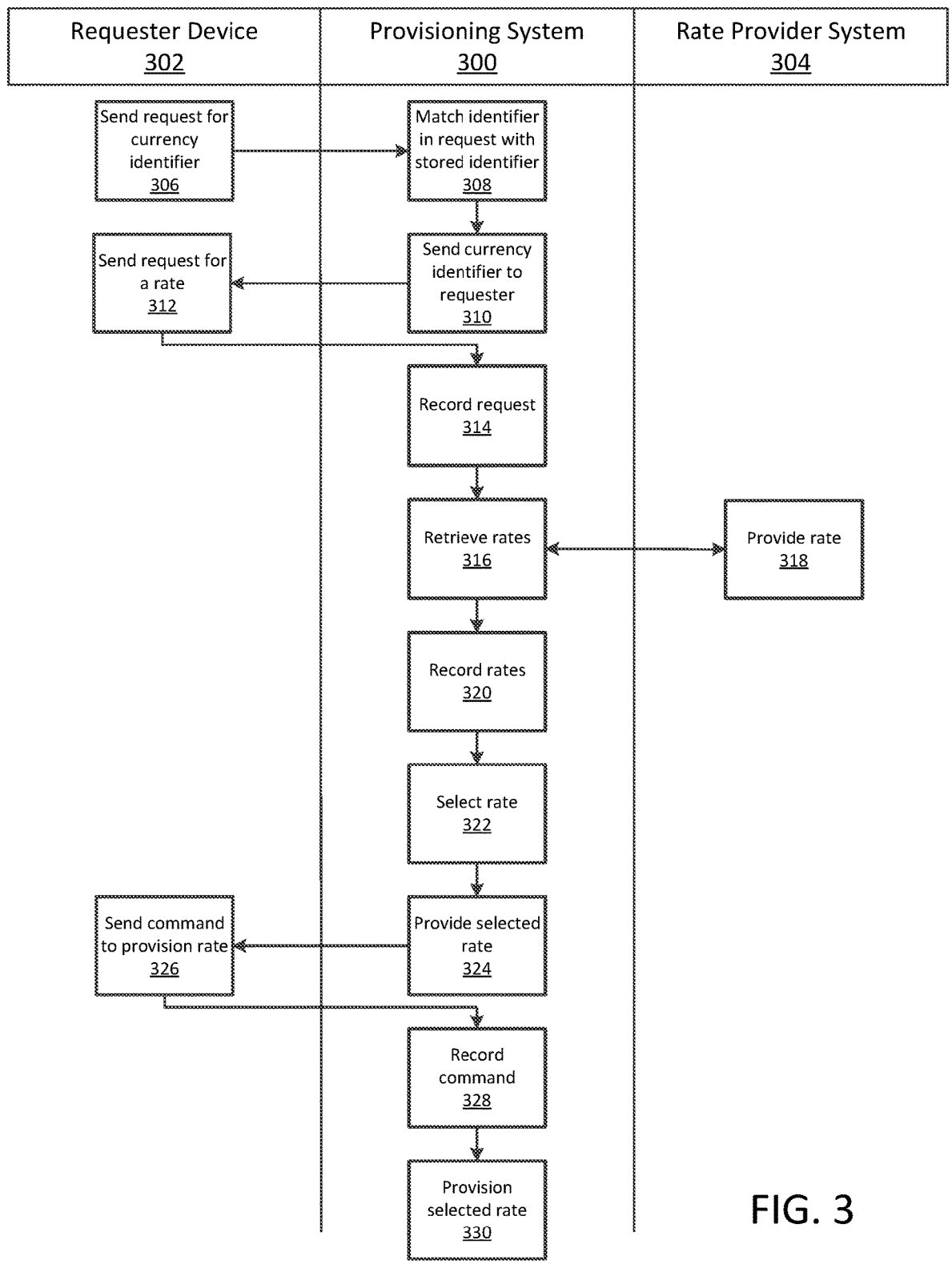
FIG. 3 is a swim lane diagram showing the provisioning of a data according to embodiments.

FIG. 3 depicts a swim lane diagram showing interactions between a provisioning system 300, and one or more requester devices 302 and data provider systems 304. These devices and systems may be similar to those described in relation to FIG. 1. The provisioning system 300 may maintain a decentralized ledger, which may be embodied as smart code that includes data of all current and previously provided requests, data, and provisioned data. Each new request and data may be appended onto the ledger. Each request and data and/or other function call on the smart code may be viewed and verified by all participants using public and private keys.

Each function call on the smart code may create a ledger entry. Each ledger entry is aggregated with others to form a block of ledger entries that maybe validated by one or more nodes of the provisioning system 300. Once validated, the block may be broadcast to other nodes and added to a main ledger. One such function call may be a deposit function. For example, a data provider who wants to provide data must deposit an asset for exchange. They do this by invoking the transfer function on the smart code corresponding to the asset they'd like to transfer, pointing the destination of the transfer to the smart address of the provisioning system 300. The smart code takes ownership of the funds and issues to the depositor a balance on the provisioning system 300 in the corresponding asset. The transfer is signed with one of the private keys of the data provider system 304 depositing the asset. Another such call may be a createData function. A created data set may be signed with the same private key of the data provider system 304 as the one controlling the balance of the currency asset on the provisioning system 300. The data provider system 304 creates a createData function, signs it, and submits it to one of the provisioning system nodes. This creates a data set on the provisioning system 300 whose unique identifier is a combination of the digital signature and a data identifier. As another example, an updateData function may be used to update an existing data set. The updated data set is signed with the same private key of the data provider system 304 as the one controlling the balance of the currency asset on the provisioning system 300. A cancelData function may be used to change the status of an existing data set to canceled or otherwise marked as invalid. The cancelData function may be signed with the same private key of the data provider system 304 as the one controlling the balance of the currency asset on the marketplace. A lockData function locks the data set for a dataLockDuration. If a data set is associated with a maximum amount, the smart code forbids locking a data set for an amount exceeding the maximum amount minus an existing locked asset. The lockData function may be signed with one of the private keys of the requester device 302 (or a party acting on behalf of the requester). A provisionData function may be signed with one of the private keys of the requester device 302 (or a party acting on behalf of the requester) and releases. A settle function may cause the currency assets to be moved between the data set provider system 304 and the requester device 302 and/or accounts thereof. A withdraw function withdraws currency assets from the participants' balance on the provisioning system 300 smart code to an address of their choice, such as a financial account number.

In some embodiments, such as when the requester does not know an identifier associated with the base currency and/or the foreign currency, the requester device 302 may communicate a request for a currency identifier to the provisioning system 300 at block 306. The provisioning system 300 may then attempt to match the identifier from the request with a currency identifier on the decentralized ledger at block 308, similar to as described in relation to FIG. 2. The matched currency identifier may be provided to the requester device 302 at block 310. In instances where the requester already knows the currency identifier, blocks 306-310 may be omitted.

At block 312 the requester device 302 may communicate a request for a data to the provisioning system 300. In some embodiments where the data includes a rate, the request may include an exchange amount, a base currency identifier, a foreign currency identifier, and/or additional information. In some embodiments, the requester may want only a single data from a particular data provider computing system. In such embodiments, the request may also include an identifier associated with the particular one of the data computing systems from which a data set is to be requested. Oftentimes, the request may be digitally signed by the requester device 302 prior to sending the request to the provisioning system 300. The provisioning system 300 may record information associated with the request on the decentralized ledger at block 314. In some embodiments, this information may instead be written to a local database, with only inputs from a requestor related to a data lock (such as when the requestor issues a command to provision or lock the data) being written to the distributed ledger. At block 316, the provisioning system 300 may retrieve one or more data sets. In some embodiments, each data set may include information regarding a number of variables. For example, a data set may consist of a data provider system identifier (which may be identified by a provisioning system address, such as a public key associated with the data provider system 304), a requester device identifier (if known) that may be in the form of a public key associated with a particular requester device 302, the data, a base currency identifier, a foreign currency identifier, a maximum amount of base currency (in embodiments where the data includes a rate), a data lock duration that locks a data set for presentation to a requester device 302, a data guarantee duration that sets a time limit for how long the data is guaranteed once a data provisioning command is received, and/or other information. As just one example for a currency rate application, a rate may be [rate provider device's public key, empty (as the requester may not be specified unless the rate was provided directly in response to a particular request), 1.1 (rate), USD (base currency identifier), EUR (foreign currency identifier), $50,000.00 (maximum amount of base currency), 10 minutes (rate lock duration), 120 days (rate guarantee duration)].

Retrieving data sets may include the provisioning system 300 accessing the decentralized ledger to view previously appended data sets that are still valid and/or submitting commands to one or more of the data computing devices for new data sets based on the particular request. To determine whether a preexisting data set is still valid, the provisioning system 300 may read expiration data associated with each data set. For example, a particular data set may have an expiration time and/or date. Another data set may have an indicator that instructs the provisioning system 300 to determine the data set is valid until a new data set is provided by a corresponding data set computing system. At block 318, one or more of the data set provider systems 304 may provide new data sets to the provisioning system 300. In some cases one or more of the data provider system 304 may provide updated data sets throughout the day. The updating of data sets may be done on a set schedule, based on other data sets appended to the decentralized ledger, in response to other data requests, in response to particular economic factors, and/or for other reasons. In some embodiments, each data set may be digitally signed by the data provider system 304 using a private key.

The provisioning system 300 may append each of the received data sets to the decentralized ledger at block 320. A best data set may be selected from the retrieved data sets (which may be a single data set if the requester specified a particular data computing device), by the provisioning system 300 at block 322. The selected data set may then be provided to the requester device 302 at block 324. In some embodiments where the data set has been digitally signed, the requester device 302 may decrypt the data set using a public key. The requester device 302 may provide a command (which may be digitally signed using the private key of the requester device 302) to the provisioning system 300 that instructs the provisioning system 300 to provision the selected data set at block 326. A record of the input may be appended to the decentralized ledger by the provisioning system at block 328. The provisioning system 300 may then provision the selected data set at block 330.

In some embodiments, provisioning the data set includes the provisioning system 300 determining a set of instructions to be used to transfer and exchange funds. The set of instructions may be determined based on information within the request and/or information associated with the selected data set. The provisioning system 300 may then transmit the set of instructions to both the requester device 302 and the data provider system 304 associated with the selected data set. In some embodiments, the set of instructions may include separate instructions for the requester device 302 and the data provider system 304. The requester device 302 and the data provider system 304 may each receive the instructions (or the portion of the instructions corresponding to the particular entity). In currency applications, the requester device 302 and the data provider system 304 may execute the instructions, including exchanging respective volumes of the base currency and the foreign currency. A configuration of the execution of the instructions may be communicated to the provisioning system 300. The provisioning system 300 receives confirmations from the requester device 302 and/or the data provider system 304. The provisioning system 300 then appends information associated with the execution of the instructions on the decentralized ledger.

By capturing and appending the request, data, and input information to the decentralized ledge at each stage of the provisioning process, the provisioning system 300 provides a distributed ledger containing all of the information that is viewable by all devices interacting with the provisioning system 300 using their respective public keys and private keys. This provides proof of validity for each bit of information. Additionally, the provisioning system 300 may store the distributed ledger on a number of provisioning system nodes as described elsewhere herein. These nodes may be operated by the provisioning system 300 and/or by third parties, such as requester devices 302 and/or data provider systems 304. By storing all or part of the decentralized ledger on a number of nodes operated by various entities, no trusted intermediary is needed to ensure the validity of each request, data, and provisioned data.

Figure 4:
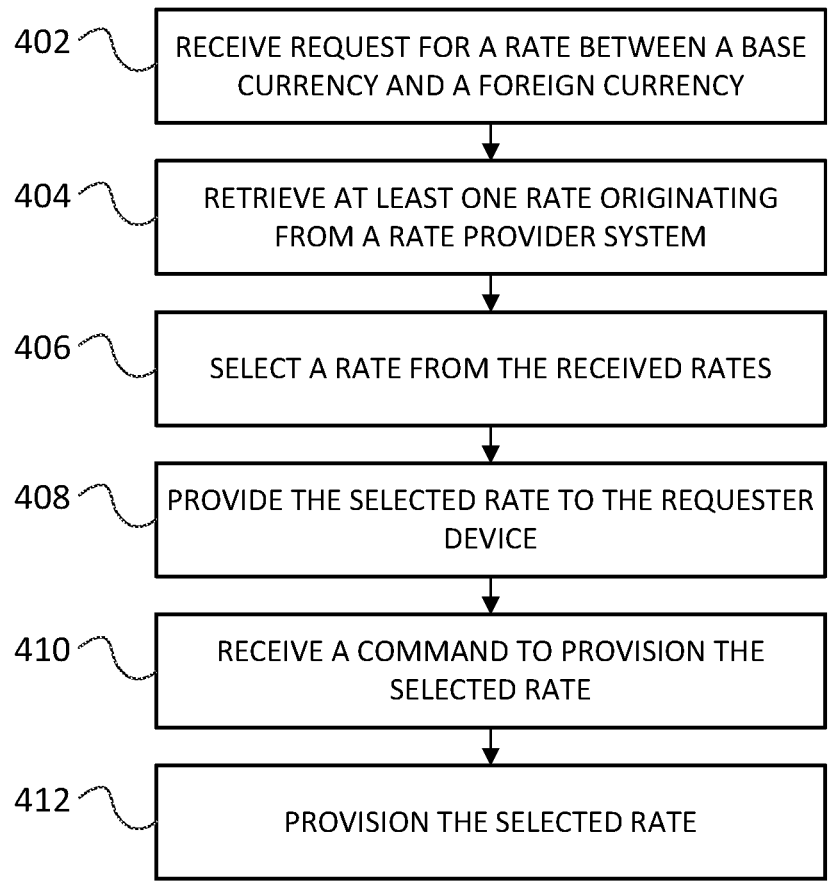
FIG. 4 is a flowchart of a process of provisioning data according to embodiments.

FIG. 4 depicts a flowchart of a process 400 for provisioning data. Process 400 may be performed by a provisioning system such as those described in relation to FIGS. 1-3. Process 400 may begin by receiving a request for a data at block 402. In some embodiments of currency based applications, the request may include an exchange amount, an identifier associated with the base currency, and/or an identifier associated with the foreign currency. In some embodiments, the request may also include an provider identifier associated with a particular data computing system from which a data set is requested. At block 404, at least one data set is received one or more one data provider systems. In some embodiments, this may be a single data set from the data provider system associated with the provider identifier. In other embodiments, a data set may be received from each of a number of data provider systems. In some embodiments, the data set(s) may be received in response to the provisioning system notifying the data provider systems of the received request. In other embodiments, the data set(s) may be provided at any time, such as at periodic intervals and/or any time a particular rating computing system updates a data set. If a data set is provided prior to the provisioning system receiving a request, the provisioning system may look up a history of previously received data sets on a distributed ledger.

A particular exchange data set may be selected from the at least one exchange data set at block 406. The selected data set may be a best data set of a plurality of received data sets. In currency applications, the best data/rate may be determined by being the highest or lowest rate and/or the rate provided a greatest dollar value to the requesting computing device. In some embodiments, the selected data is valid for a predetermined time period set by the particular one of the at least one data computer system. For example, the data computing system may specify that the data set only be valid for a 15 minute window commencing when the data set is provided to the provisioning system. In other embodiments, the selected data set may be valid only for the request from the requesting computer system. The selected data set may be provided to the requesting computer system at block 408. In some embodiments, this may merely involve directing the requester device to a location on a decentralized ledger that includes the selected data set, while in other embodiments the selected data set may be directly transmitted to the requester device. At block 410, a command to provision the selected data set may be received from the requesting computing device. The command to provision the selected data set may be provided to a particular one of the at least one data set computer system associated with the selected data set. The provisioning system may then provision the selected data set at block 412.

In some embodiments, each time information is received by the provisioning system some or all of the information may be appended to a distributed ledger or database. For example, upon receiving a request, details associated with the request, such as the base currency identifier, foreign currency identifier, exchange amount, and/or other information may be appended to the ledger. As another example, information associated with each received data set may be appended to the ledger upon receipt. This may include the data set itself, as well as information regarding a period of validity of the data set, the requesting device identifier, the data set provider identifier, a base currency identifier, a foreign currency identifier, data lock duration, data guarantee duration, and the like. For example, some data sets may be valid for a particular transaction, other data sets may be valid for a particular time limit, some data sets may be valid indefinitely, and some data sets may be valid only for particular currency volume thresholds. Other validity criteria may also be used. In some embodiments, once a data set is selected, information associated with the selected data set may be appended to the ledger. Information associated with the input to provision the selected data set may also be appended to the ledger. Additionally, any information associated with the actual provisioning of the selected data set may be appended to the ledger. It will be appreciated that any combination of information appended to the ledger and timing of the appending may be utilized, with some embodiments, including additional information and/or omitting some appending steps. For example, in some embodiments, only information related to the locking of data sets may be appended, such as data sets (and lock durations and guarantees) provided by a data provider system, commands to provision a data set from the requesting device, and the like may be appended to the distributed ledger.

Additionally, some or all of the data received by the provisioning system and/or appended to the ledger may be digitally signed, such as by the sending party digitally signing the data with the sending party's own private key. Once signed, parties to the provisioning system that have corresponding public keys may view and validate the information. By signing data with the private key, any party having the corresponding public key may be assured that the data originated from the particular signing party. Oftentimes, digitally signed data will be provided to the provisioning system and/or other parties along with the public key associated with the signing party. This public key may be used by each party to verify the origination of the data.

The distributed ledger may be stored on a number of nodes, with the nodes being operated by one or more entities. For example, the nodes may be operated by the provisioning system, one or more requesting devices, and/or one or more data provider devices. The simultaneous possession of the dynamically updated ledger ensures transparency of the information contained therein so as to provide an assurance of validity to all entities accessing the data, thus eliminating the need for a single trusted intermediary. The ledger may include data related to some or all previous requests, previous data sets, and/or previous provisioned data sets by the data provisioning system.

Figure 5:
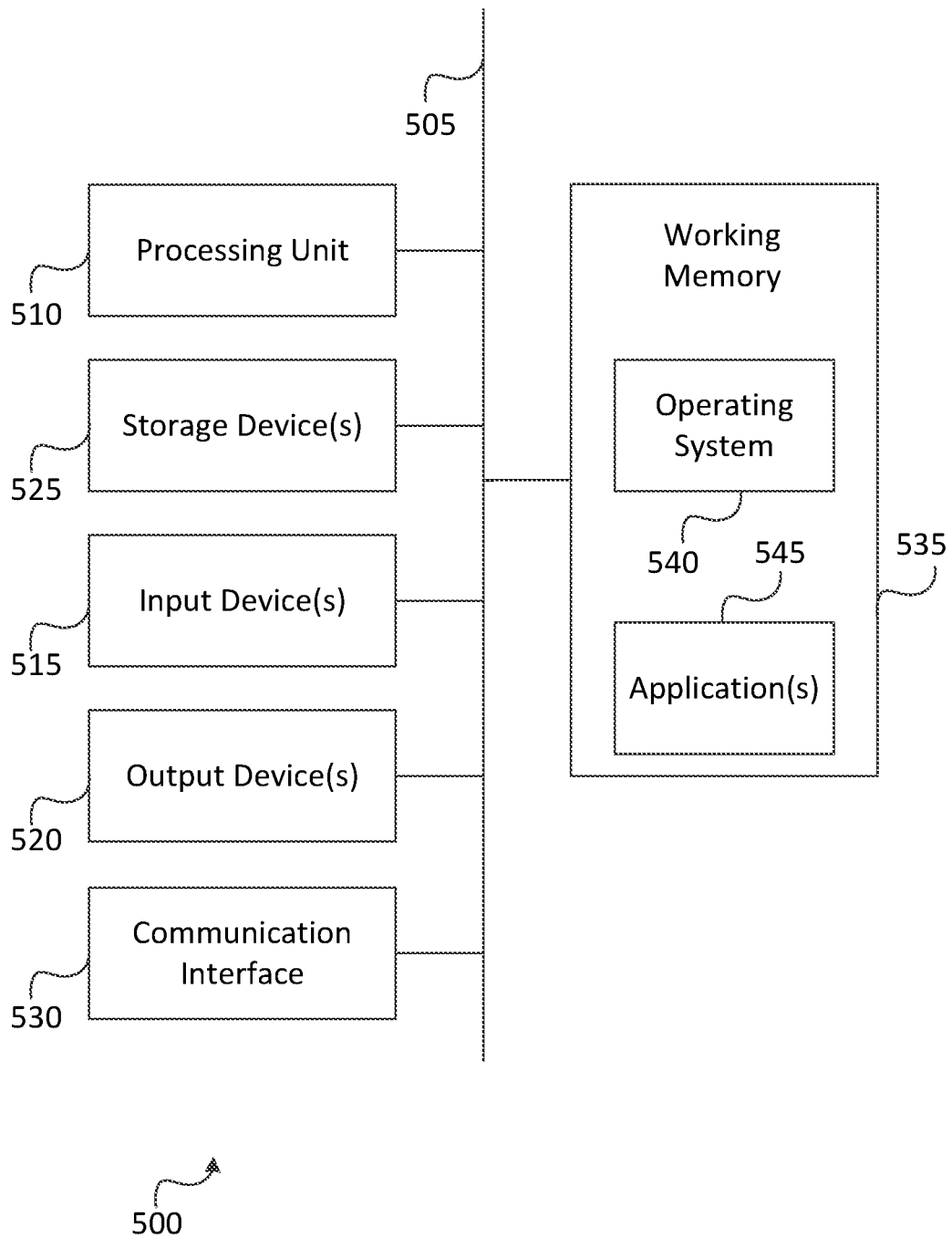
FIG. 5 is a diagram of a computing device according to embodiments.

A computer system as illustrated in FIG. 5 may be incorporated as part of the previously described computerized devices. For example, computer system 500 can represent some of the components of provisioning systems 100 and 300, requester devices 104 and 302, data provider systems 106 and 304, servers operating network 108, and/or other computing devices as described herein. FIG. 5 provides a schematic illustration of one embodiment of a computer system 500 that can perform the methods provided by various other embodiments, as described herein, and/or can function as a server, provisioning system, requester device, data provider device, point of sale device, mobile device, and/or other computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors programmed to perform particular functions, such as one or more special-purpose processors (such as digital signal processing chips, graphics acceleration processors, and/or the like); one or more input devices 515, which can include without limitation a mouse, a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, ledger or database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM and/or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a computer for a specific purpose using the instructions/code stored thereon. These instructions might take the form of executable code, which is executable by the computer system 500 and/or might take the form of source and/or installable code, which, upon compilation and/or installation on the computer system 500 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system having specialized components. For example, a provisioning system configured to provide some or all of the features described herein relating to the provisioning of data sets can comprise hardware and/or software that is specialized (e.g., an application-specific integrated circuit (ASIC), a software method, etc.) to carry out a specific function. Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A data provisioning system, comprising:

a memory;

at least one communications interface configured to enable communication with a requester device and at least one data provider system;

and a processor configured to:

receive, from the requester device, a digitally signed request for a data set, the digitally signed request comprising an exchange amount, wherein the digitally signed request has been digitally signed using a private key of the requester device;

retrieve at least one digitally signed data set from each of the at least one data provider system, wherein each of the at least one digitally signed data set has been digitally signed using a private key of a respective one of the at least one data provider system;

append each of the at least one digitally signed data set to a distributed ledger, the distributed ledger being run on a plurality of remotely located nodes, the distributed ledger comprising digitally signed data related to previous interactions of the data provisioning system;

select a particular data set from the at least one digitally signed data;

provide the selected data set to the requester device based on the digitally signed request for the data set;

receive, from the requester device, a digitally signed command to provision the selected data set;

append the digitally signed command to provision the selected data set to the distributed ledger, wherein appending the digitally signed command causes a particular one of the at least one data provider system associated with the selected data set to be notified of the digitally signed command; and provision the selected data set.

2. The data provisioning system of claim 1, wherein:

the selected data set is valid for a predetermined time period set by the particular one of the at least one data provider system.

3. The data provisioning system of claim 1, wherein:

the selected data set is valid only for the digitally signed request from the requester device.

4. The data provisioning system of claim 1, wherein:

the at least one data provider system comprises a plurality of data provider systems;

the processor is further configured to determine a best data set from the data sets from the plurality of data provider systems; and the selected data set comprises the best data set.

5. The data provisioning system of claim 1, wherein:

the digitally signed request comprises the particular one of the at least one data provider system.

6. The data provisioning system of claim 1, wherein:

the processor is further configured to provide each of the at least one digitally signed data set to each of the at least one data provider system.

7. The data provisioning system of claim 1, wherein the processor is further configured to:

append the selected data set to the distributed ledger.

8. The data provisioning system of claim 1, wherein:

the plurality of remotely located nodes are operated by one or more of the requester device, additional requester devices, and at least some of the at least one data provider system.

9. The data provisioning system of claim 1, wherein:
retrieving the at least one digitally signed data set comprises accessing the distributed ledger and identifying one or more data sets that are valid at the time of the digitally signed request.

10. The data provisioning system of claim 1, wherein:
the requester device and each of the at least one data provider device is a respective one of the plurality of remotely located nodes.

11. A method for provisioning data, the method comprising:
receiving, from a requester device, a digitally signed request for a data, the digitally signed request comprising an exchange amount, wherein the digitally signed request has been digitally signed using a private key of the requester device;
retrieving at least one digitally signed data set from each of at least one data provider system, wherein each of the at least one digitally signed data set has been digitally signed using a private key of a respective one of the at least one data provider system;
appending each of the at least one digitally signed data set to a distributed ledger, the distributed ledger being run on a plurality of remotely located nodes, the distributed ledger comprising digitally signed data related to previous interactions of the data provisioning system;
selecting a particular data set from the at least one digitally signed data set;
providing the selected data set to the requester device based on the digitally signed request for the data set;
receiving, from the requester device, a digitally signed command to provision the selected data set, wherein the digitally signed command has been digitally signed using the private key of the requester device;
appending the digitally signed command to provision the selected data set to the distributed ledger, wherein appending the digitally signed command causes a particular one of the at least one data provider system associated with the selected data set to be notified of the digitally signed command; and
provisioning the selected data set.

12. The method for provisioning data of claim 11, wherein:
the selected data set is valid for a predetermined time period set by the particular one of the at least one data provider system.

13. The method for provisioning data of claim 11, wherein:
the selected data set is valid only for the digitally signed request from the requester device.

14. The method for provisioning data of claim 11, wherein:
the at least one data provider system comprises a plurality of data provider systems;
the method further comprises determining a best data set from the data sets from the plurality of data provider systems; and
the selected data set comprises the best data set.

15. The method for provisioning data of claim 11, wherein:
the digitally signed request comprises the particular one of the at least one data provider system.

16. The method for provisioning data of claim 11, further comprising:
providing each of the at least one digitally signed data set to each of the at least one data provider system.

17. The method for provisioning data of claim 11, further comprising:
appending the selected data set to the distributed ledger.

18. The method for provisioning data of claim 11, wherein:
the plurality of remotely located nodes are operated by one or more of the requester device, additional requester devices, and at least some of the at least one data provider system.

19. The method for provisioning data of claim 11, wherein:
authenticity of digitally signed information on the distributed ledger is verifiable using a public key of an originating device of the digitally signed information.

\* \* \* \* \*